May 18, 1937. M. P. BLOMBERG 2,080,757
HEATING AND VENTILATING SYSTEM FOR VEHICLES
Filed Dec. 17, 1934 8 Sheets-Sheet 1
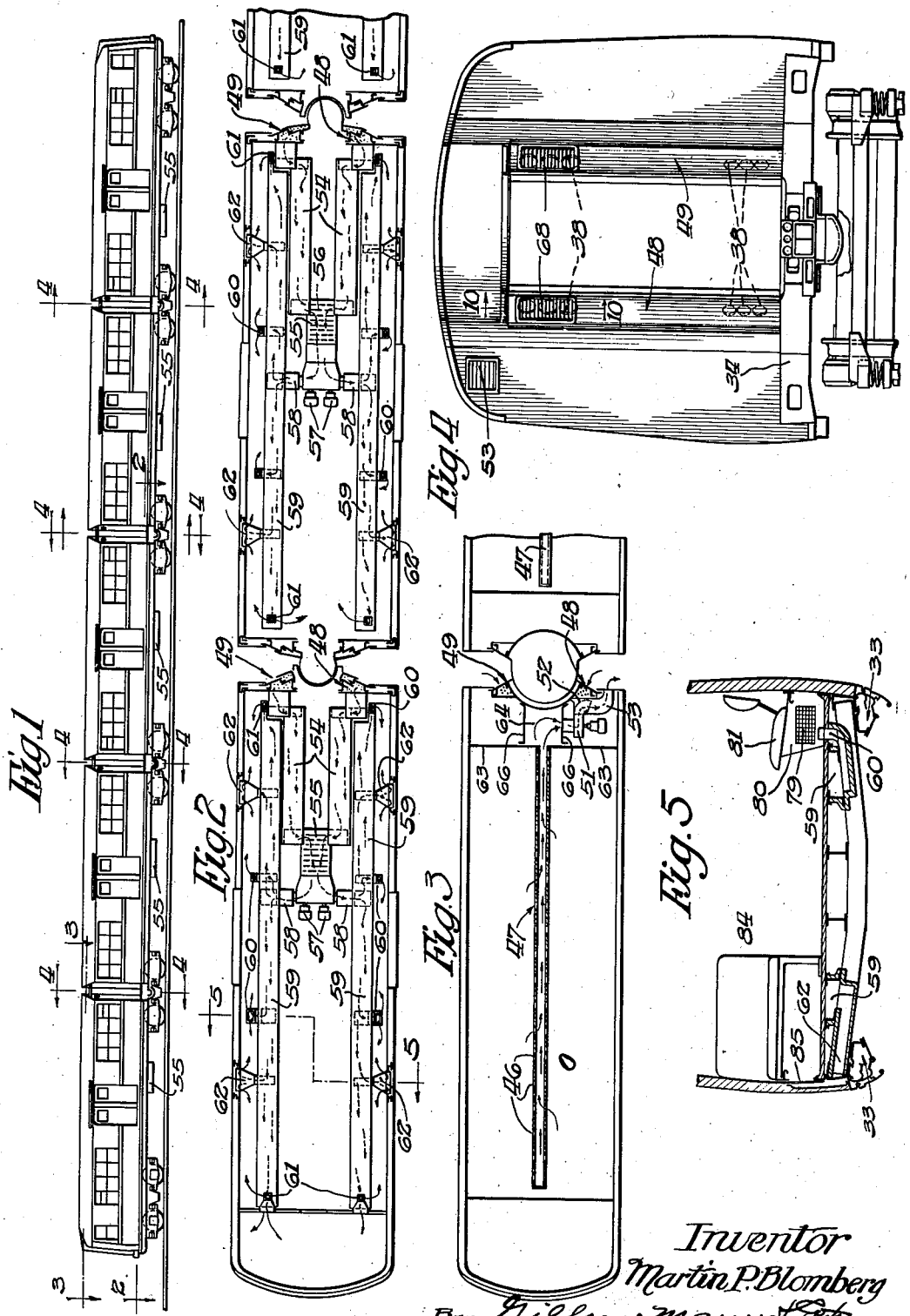
Inventor
Martin P. Blomberg May 18, 1937.  M. P. BLOMBERG  2,080,757
HEATING AND VENTILATING SYSTEM FOR VEHICLES
Filed Dec. 17, 1934   8 Sheets-Sheet 2

Inventor
Martin P. Blomberg
By Gibson, Mann & Cox
Attys.

May 18, 1937.  M. P. BLOMBERG  2,080,757
HEATING AND VENTILATING SYSTEM FOR VEHICLES
Filed Dec. 17, 1934  8 Sheets-Sheet 3
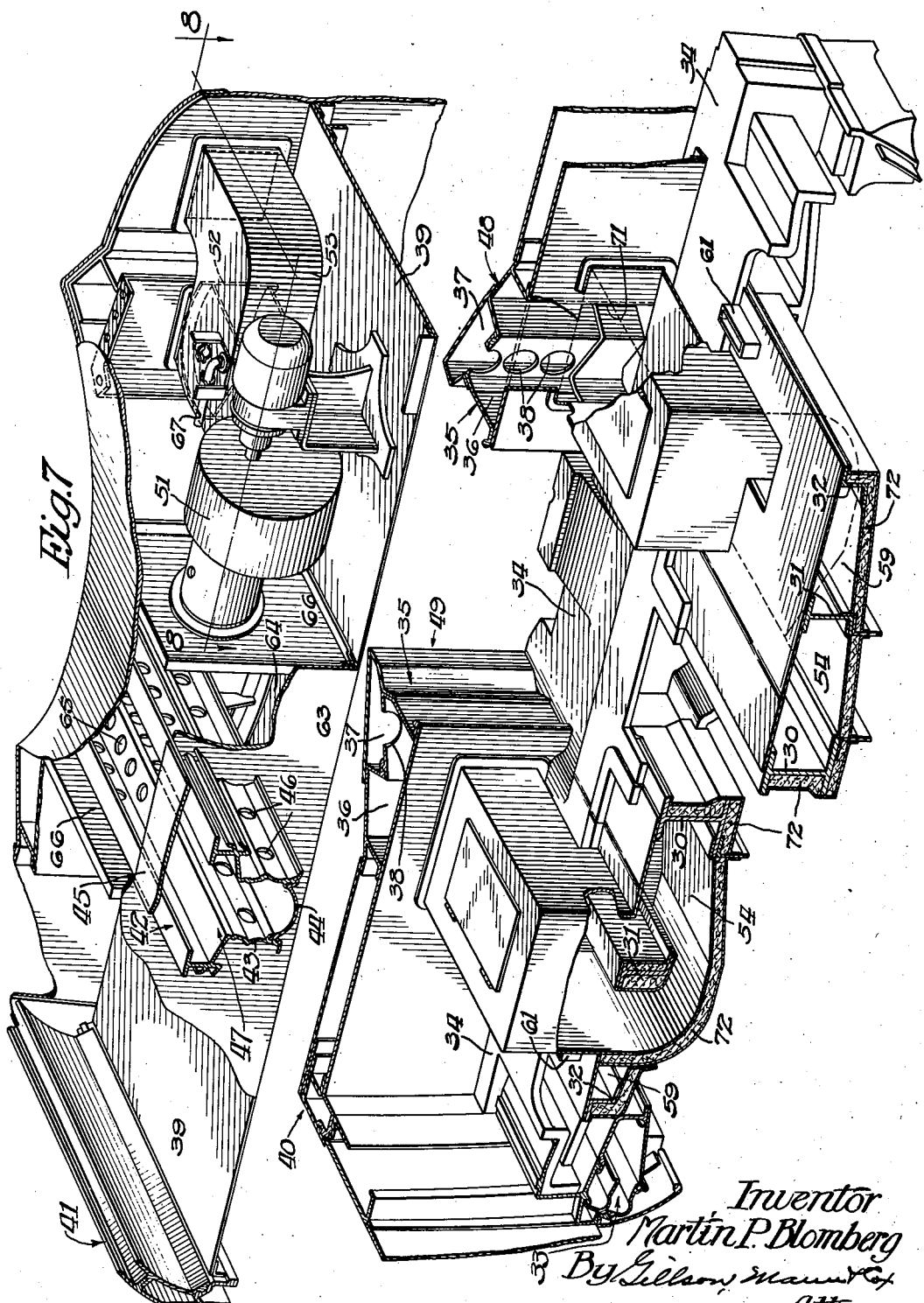

May 18, 1937.  M. P. BLOMBERG  2,080,757
HEATING AND VENTILATING SYSTEM FOR VEHICLES
Filed Dec. 17, 1934  8 Sheets-Sheet 4
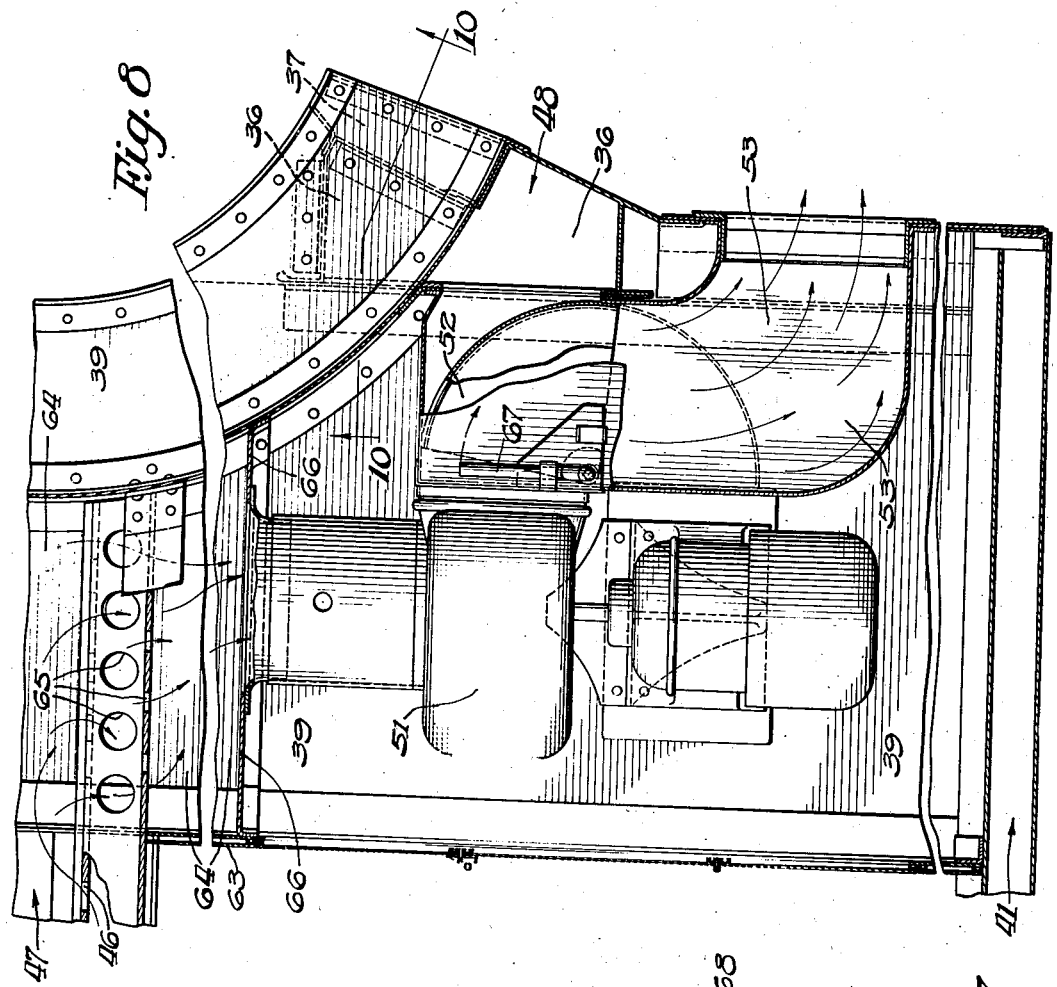
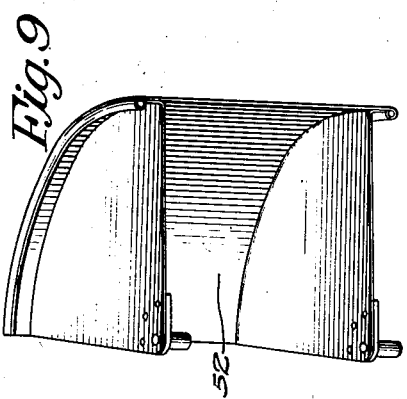
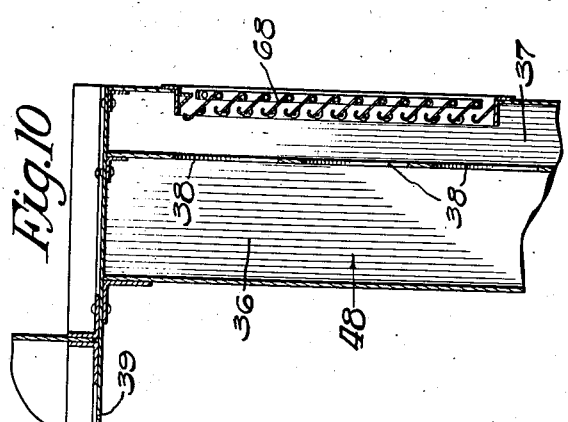
Inventor
Martin P. Blomberg
By Gilson, ———
Attys.

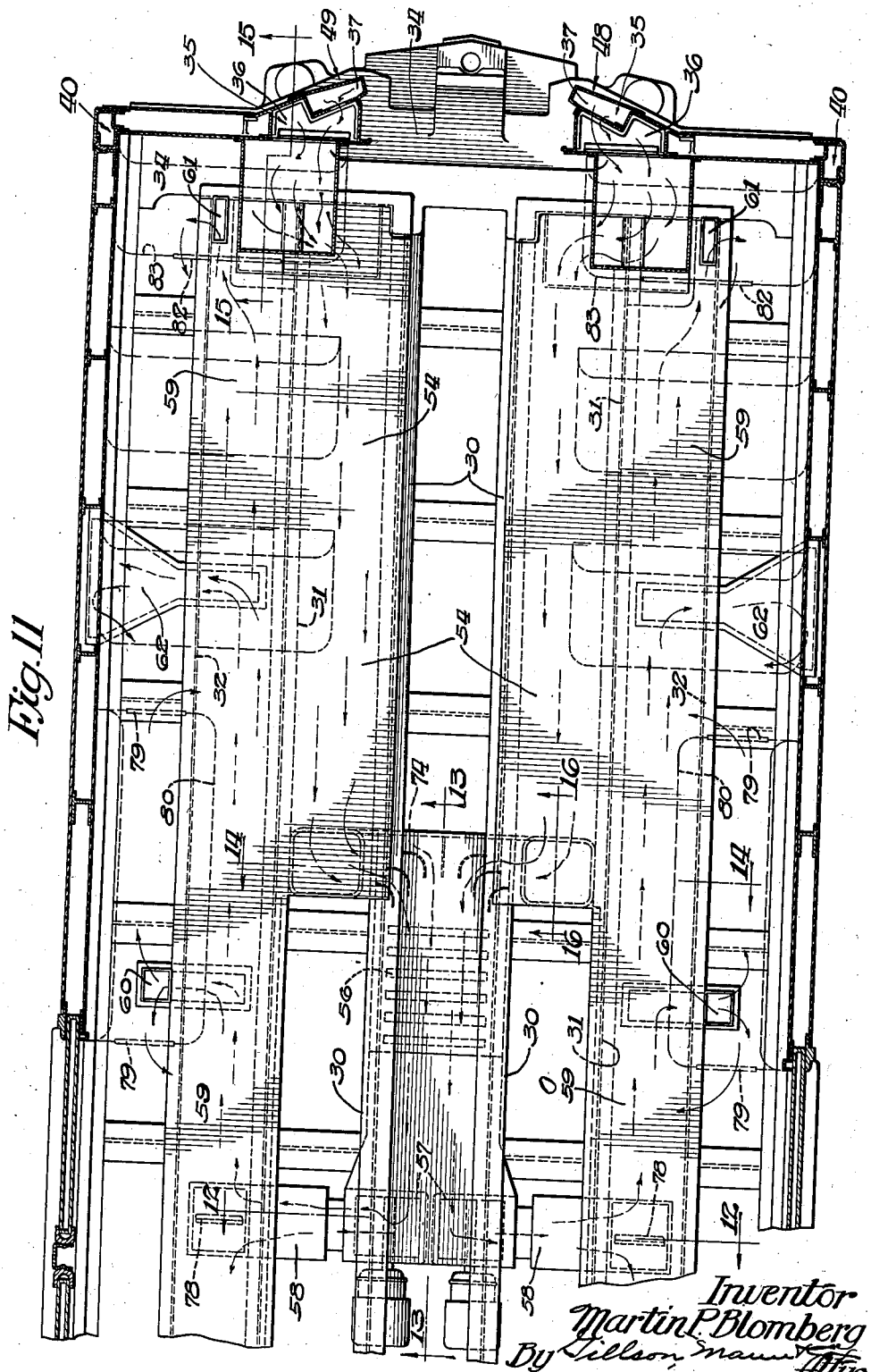

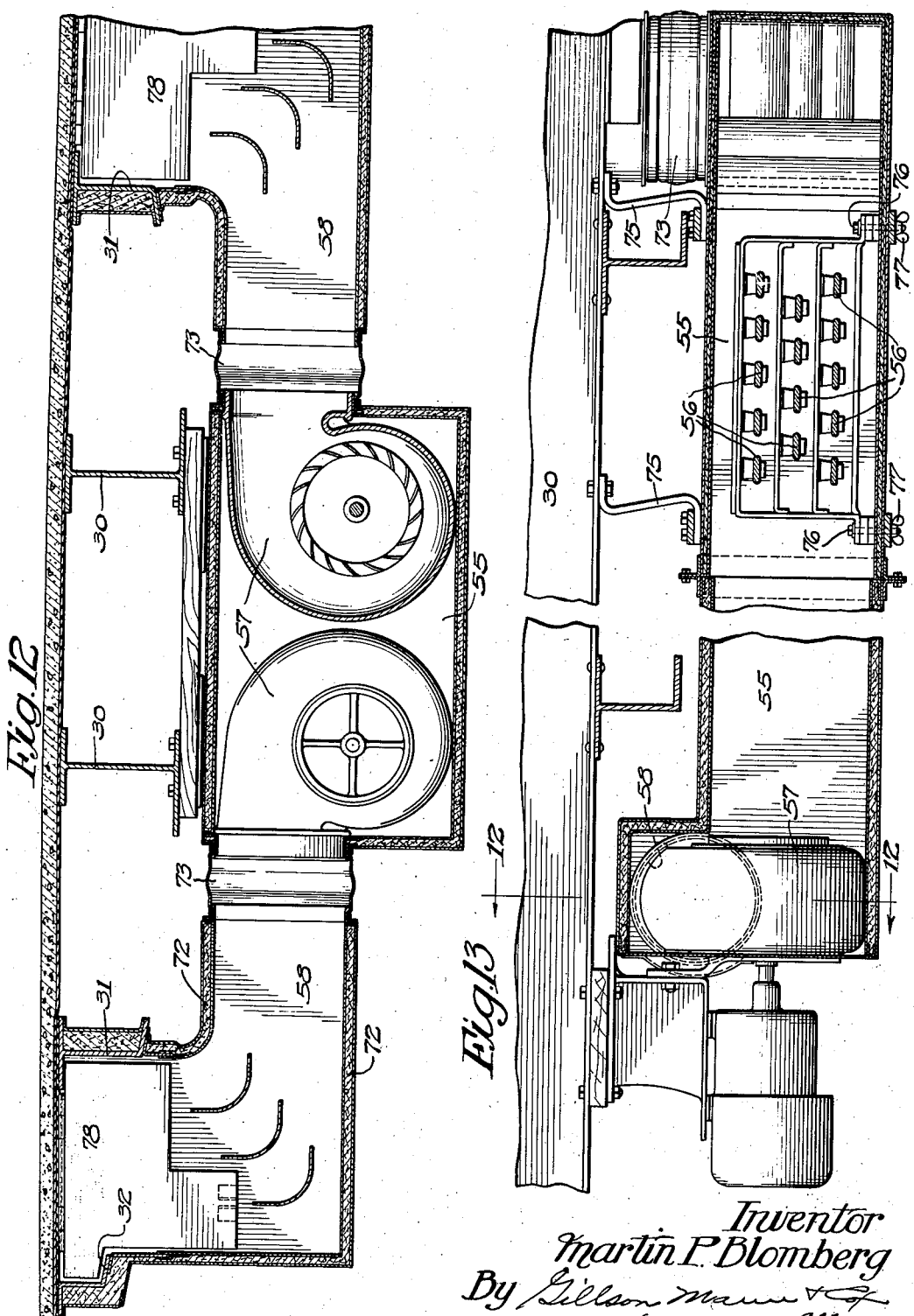

May 18, 1937.　　M. P. BLOMBERG　　2,080,757
HEATING AND VENTILATING SYSTEM FOR VEHICLES
Filed Dec. 17, 1934　　8 Sheets-Sheet 7
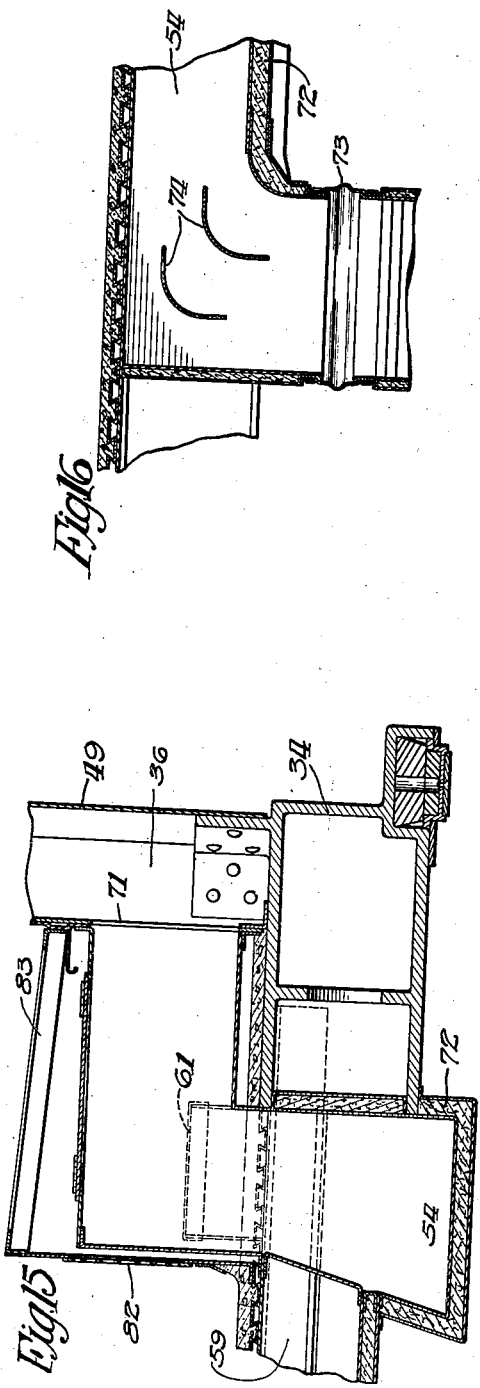

May 18, 1937.  M. P. BLOMBERG  2,080,757
HEATING AND VENTILATING SYSTEM FOR VEHICLES
Filed Dec. 17, 1934  8 Sheets-Sheet 8
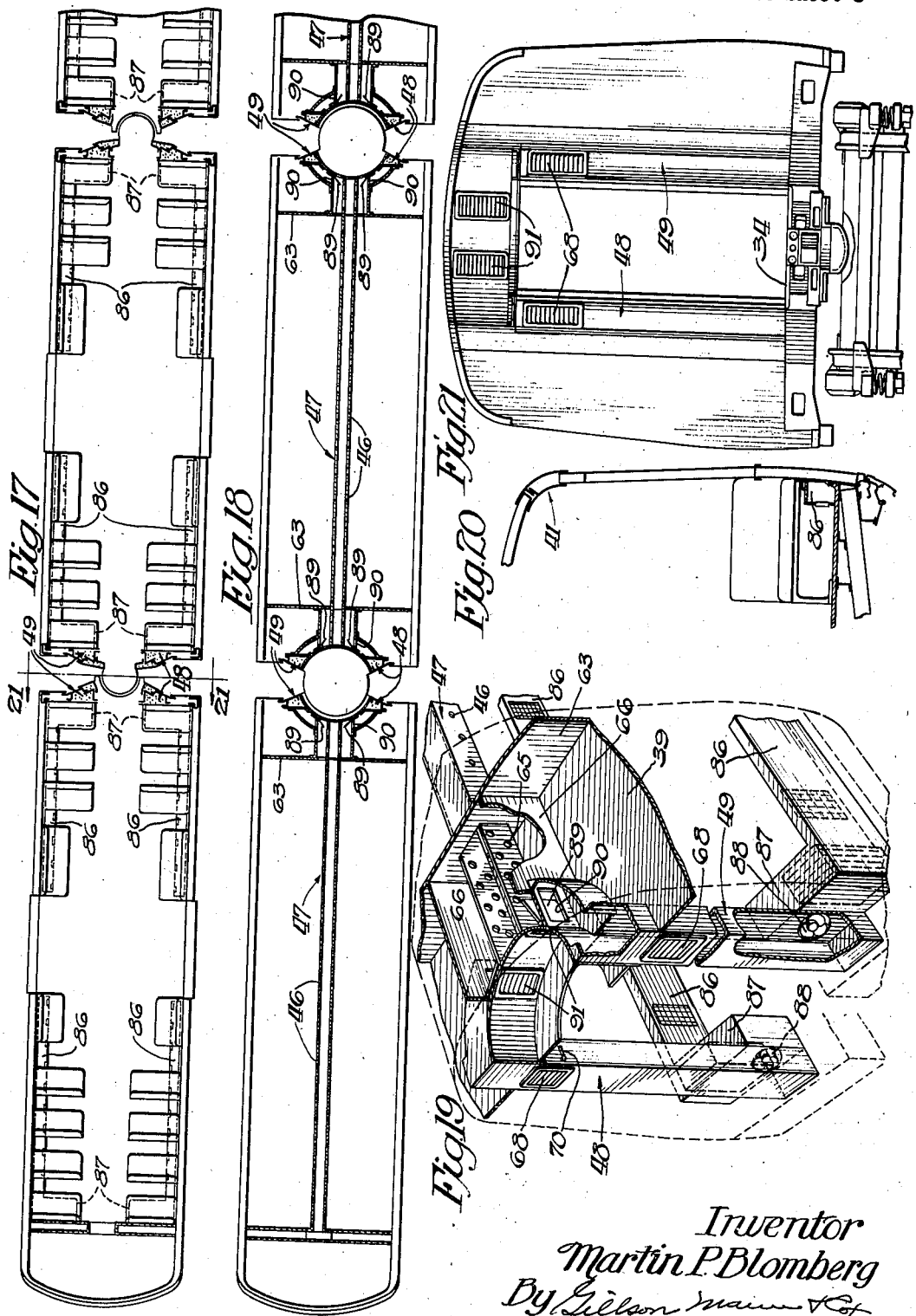
Inventor
Martin P. Blomberg
By Gilson, Martin & Co.
Attys.

Patented May 18, 1937

2,080,757

UNITED STATES PATENT OFFICE 2,080,757

HEATING AND VENTILATING SYSTEM FOR VEHICLES

Martin P. Blomberg, Chicago, Ill., assignor to Pullman-Standard Car Manufacturing Company, a corporation of Delaware Application December 17, 1934, Serial No. 757,867

12 Claims. (Cl. 98—10)

Street cars, suburban railway cars, elevated trains, subway trains, buses, and in general that class of vehicles which daily carry the vast army of commuters to and from the larger cities, require high capacity ventilating and heating systems to satisfactorily handle the load imposed on them by conditions of service. The conventional deck ventilators and heating radiators are grossly inadequate for peak loads.

The principal object of this invention, therefore, is to provide a heating and ventilating system for vehicles of this class which has the proper capacity for handling the heavy loads occasioned by overcrowding of the vehicles, frequent stops during which the vehicle doors are opened wide to accelerate the loading and unloading of the vehicle; which is readily converted from a system of ventilation alone to a system which combines heating with ventilation; which recirculates a large proportion of the air in the vehicle when heating is required in order to cut down heating costs; and which advantageously utilizes space in and about the vehicle for locating air ducts, heating equipment, and other appurtenances in the system so that there is no encroachment on passenger space and weight is reduced to a minimum.

There are other objects and advantages inherent in the illustrative embodiment of the invention shown in the drawings, in which—

Fig. 1 is a side elevational view of a multi-section articulated car equipped with a heating and ventilating system which follows the teachings of this invention;

Fig. 2 is a longitudinal, sectional view through the first two car sections and a portion of the third, the section being taken on the line 2—2 of Fig. 1 and showing the floor duct arrangement;

Fig. 3 is a fragmentary, longitudinal section taken on the line 3—3 of Fig. 1 and showing the upper duct arrangement;

Fig. 4 is an end elevational view taken on any one of the section lines 4—4 shown in Fig. 1;

Fig. 5 is a somewhat diagrammatic, fragmentary sectional view taken on the line 5—5 of Fig. 2;

Fig. 7 is a perspective view showing the arrangement of the air ducts and auxiliary equipment at the end of the car, parts of the view being broken away to more clearly show the structure;

Fig. 8 is a longitudinal, sectional view taken on the line 8—8 of Fig. 7 showing particularly the damper arrangement whereby the air withdrawn from the car interior may be either re-circulated or exhausted from the car;

Fig. 9 is a perspective view of the damper;

Fig. 10 is a fragmentary, sectional view taken on the line 10—10 of Fig. 8;

Fig. 11 is a plan section showing the floor duct arrangement in some detail;

Fig. 12 is a transverse, sectional view through the end of the heater box, the section being taken on the line 12—12 of Fig. 11 and showing particularly the centrifugal fans which move the air through the box and discharge it into the distributing ducts on opposite sides of the box;

Fig. 13 is a longitudinal, vertical, sectional view through the heater box, the view being taken on the line 13—13 of Fig. 11;

Fig. 14 is a transverse, sectional view taken through the receiving end of the heater box, the section being taken on the line 14—14 of Fig. 11;

Fig. 15 is a fragmentary, vertical, sectional view taken on the line 15—15 of Fig. 11;

Fig. 16 is a detail view of the elbow through which the air is led from the inside floor duct to the heater box, the section being taken on the line 16—16 of Fig. 11;

Fig. 17 is a view corresponding to Fig. 2 but showing a slightly different embodiment of the invention;

Fig. 18 is a view corresponding to Fig. 3 but modified to show the embodiment of Fig. 17;

Fig. 19 is a diagrammatic, perspective view showing the arrangement of air ducts, blowers, heaters, etc. in the modified form of the invention;

Fig. 20 is a fragmentary, vertical, sectional view showing the location of the distribution duct above the floor level in the modified form of the invention;

Fig. 21 is an end elevational view taken on the line 21—21 of Fig. 17.

Figure 6:
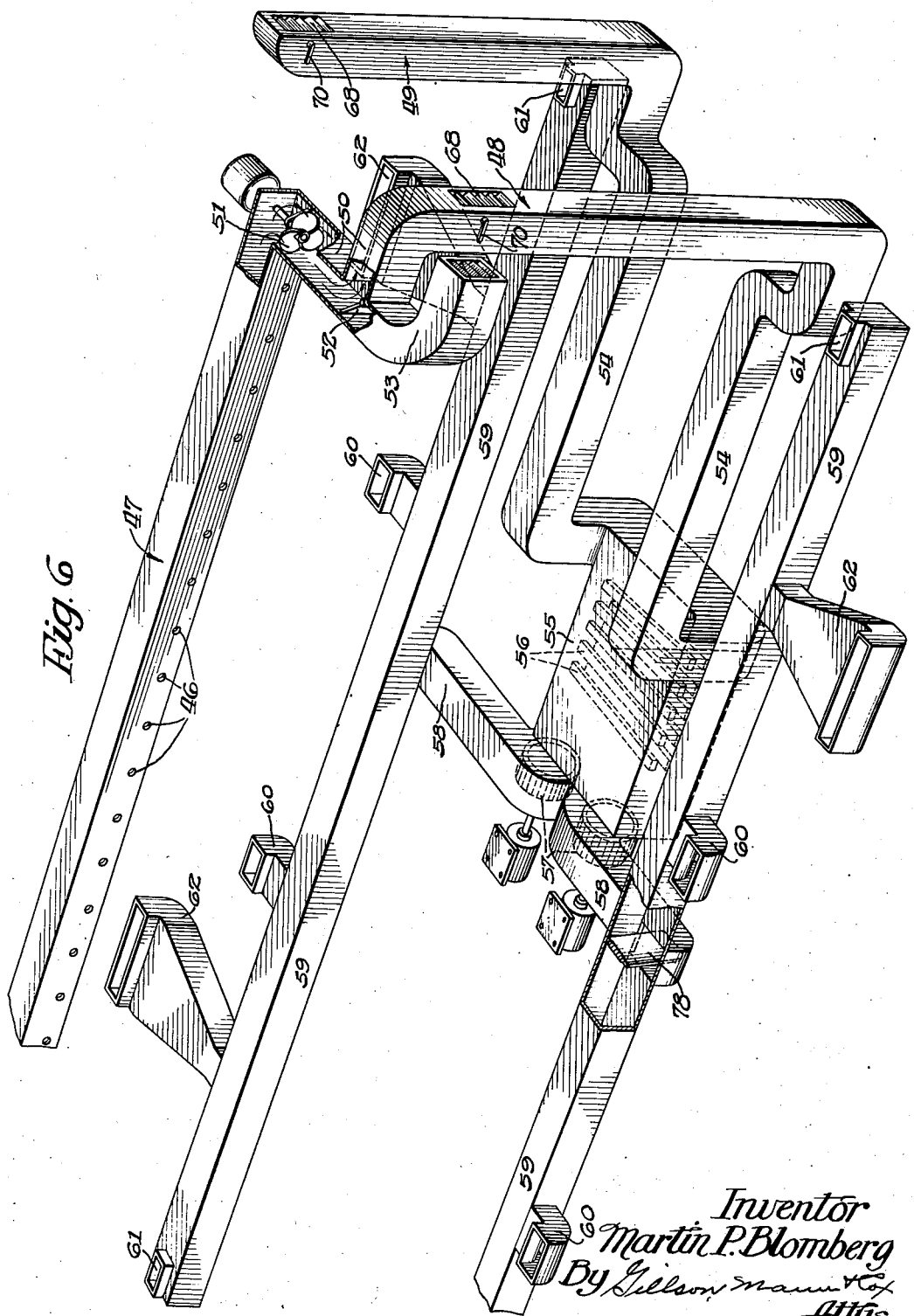
Fig. 6 is a diagrammatic, perspective view of the heating and ventilating system disassociated from the car structure.

For the purpose of disclosure, a selected embodiment has been shown applied to a multi-section, articulated car particularly adapted for use in subways or on elevated structures, but it will be understood that the invention may be variously modified within the scope of the appended claims which are to be construed as broadly as the prior art will permit.

The car framing, in so far as it is pertinent to the heating and ventilating system, includes a plurality of longitudinal sills 30, 31 and 32 (see Fig. 7), fabricated side sills 33, end sill castings 34 to which the longitudinal sills and side sills are joined, door end posts 35 built-up from a plurality of irregularly shaped bars arranged to form box columns, which include air spaces 36 and 37 connected by openings 38, an anti-telescoping plate 39 extending across the car and resting on a portion of the door end posts, corner posts 40, which, like the door end posts, are fabricated from a plurality of irregularly shaped metal sections, top chords 41 which serve as side plates and extend from corner post to corner post, and a top sill 42 comprising side members 43 of irregular shape, and a bottom closure plate 44 which with the top sheathing 45 forms a box girder, the interior of which is used in the heating and ventilating system of this invention as a duct for withdrawing air from the interior of the car, openings 46 being provided for this purpose.

A schematic arrangement of the heating and ventilating system of Figs. 1–16 inclusive is shown in Fig. 6. Briefly, the system comprises the overhead duct 47 formed by the box girder top sill 42, a pair of vertical ducts 48 and 49 at one end of the car section, both of which preferably utilize the air spaces 36 and 37 in the door end posts 35 for defining the ducts and the former being connected through a short horizontal duct section 50 to the exhaust side of a fan 51 that withdraws air from the car interior through the duct 47. Under certain conditions of usage, the vertical duct 48 is closed off from the duct 47 by means of a damper 52 which then permits the air drawn from the car interior to pass through an elbow duct 53 to the outside atmosphere.

The vertical ducts 48 and 49 communicate with longitudinal ducts 54 just below the floor line which lead to a heater box 55 in which suitable heating coils 56 are located. A pair of centrifugal fans 57 withdraw air from the heater box 55 and discharge through ducts 58 into distributing ducts 59 located on opposite sides of the box and outside of the ducts 54. Branch ducts 60, 61 and 62 then deliver the air into the car interior.

Referring now to Fig. 7, the bottom and top plates 44 and 45, respectively, of the top sill 42 terminate at the partition 63, but the irregularly shaped side members 43 pass through the partition into a receiving chamber 64. Openings 65 are provided in the sides 43 of the top sill and the large openings provided by omitting the plates 44 and 45 within the chamber 64 permit the air in the duct to pass freely into the chamber.

The fan 51 draws air from the receiving chamber 64 through one of its side walls 66 and delivers it to the exhaust duct 53 when the damper 52 is in the position shown in Figs. 7 and 8, or to the vertical duct 48 when the damper is turned through 90° (see dotted lines, Fig. 8). The position of the damper may be controlled either by automatic or manual means, a handle 67 being shown in the drawings for manually positioning the damper.

The vertical passageway 48 includes the air spaces 36 and 37 in the door end posts, the two being connected by openings 38 so that in effect they constitute a single duct.

An air inlet 68 is located in the ducts 48 and 49 adjacent the top of the doorway 69. (See Figs. 4, 6 and 10.) The inlet is adjustable as shown in Fig. 10 so that its effective opening may be varied to suit requirements. The inlet in the duct 48 may be completely closed so that in the wintertime when heating is required, the duct 48 may be used exclusively for recirculated air, while the duct 49 is used for admitting fresh air. Handles 70 are indicated in Fig. 6 for manipulating the intake shutters.

Door end posts 35 have openings 71 through their inside walls to connect the ducts 48 and 49 to boxes 72 which in turn are connected by short sections of curved ducts to the longitudinal floor ducts 54 which extend from the end of the car to the heater box 55 between longitudinal sills 30 and 31. Insulation 72 covers the ducts to prevent a waste of heat.

At a point adjacent to the inlet end of the heater box 55, the ducts 54 communicate through a flexible connection 73 with the interior of the heater box, baffles 74 being provided in the duct and at the entrance of the heater box to assist the air in changing direction.

Similar baffles are used elsewhere in the various ducts to reduce air friction in the ducts.

The heater box is suspended by brackets 75 from the underside of the car frame and the heating element 56 is preferably held in place by bolts 76 equipped with wing nuts 77 (see Fig. 13).

The box 55 is slightly enlarged at the discharge end to accommodate the blowers 57. The blowers are placed side by side, see Fig. 12, and discharge outwardly into the transverse ducts 58 which connect with the distributing ducts 59. An adjustable valve 78 is placed in each distributing duct at the place where it connects with the transverse duct 58 in order to initially determine the relative quantities of air which are to be delivered to the two ends of the distributing duct. It may be adjusted in any suitable manner.

The branch ducts 60, 61 and 62 which connect the distributing ducts 59 with the car interior, are located at places where the air may be discharged into the car interior without creating a draft; the ducts 60 communicating with the car interior through grilles 79 located at opposite ends of an enclosure 80 under the side seats 81 (see Figs. 5 and 11); the ducts 61 discharging through grilles 82 under the end seats 83; and the ducts 62 communicating with the car interior under the inside transverse seats 84 through grilles 85.

In the summertime when heating is not required, the damper 52 is set so that the air withdrawn from the car interior through duct 47 is discharged to the outside atmosphere through the exhaust duct 53. Under these conditions, it is desirable to have the greatest possible quantity of fresh air delivered into the car and the handles 70 are, therefore, turned to open the air inlets in the ducts 48 and 49. The fans 57 then draw fresh air from the outside through the ducts 48 and 49, the longitudinal ducts 54 and the ducts 55, and deliver it into the car interior through the transverse ducts, 58, distributing ducts 59 and the branch ducts 60, 61 and 62.

Obviously, when the heating coils are not required for a period of several months, they may be removed so as to reduce air friction through the box 55. Otherwise, they remain inoperative ready for use when heating is required.

When the outside air is slightly chilly, and some heating is desirable, the same arrangement and setting of dampers may be used with the heating coil in operation to take the chill out of the air.

In the wintertime, the damper 52 is set so as to divert the air drawn from the duct 47 into the vertical duct 48 and the air inlet 68 in that duct is then closed to the outside atmosphere. The fresh air inlet in the other duct 49 may be fully open or partially open, according to the fresh air required in the car for ventilation purposes. The box 55 then receives air from the car interior through one of the longitudinal ducts 54, and fresh air through the other duct 54, and the temperature of the air can be readily controlled by adjusting the current through the heating coil, or the number of heating coils in operation, and by regulating the amount of cold air taken in through the fresh air inlet in the duct 49.

It is also possible to use the duct 48 for a mixture of fresh and re-circulated air when the car is overcrowded and an exceptional amount of fresh air is needed.

It will thus be seen that the system of this invention is very flexible in its ability to meet the requirements of service conditions. Furthermore, the ducts are located so that they do not encroach upon passenger space, and make use of passageways formed by parts of the car structure. In this way, considerable weight is saved and the cost of the equipment is reduced to a minimum.

In Figs. 17-21 inclusive, a slightly different arrangement of the system is shown, the principal difference being that the distributing ducts 86 are located above the floor level underneath the seats and the heating units instead of being located beneath the car body are located in boxes 87 adjacent to the bases of the door end posts. The boxes also include fans 88 for drawing air downwardly through the vertical ducts 48 and 49 and forcing it through the heating coils and thence into the distributing ducts.

In the modified form of the invention, both of the vertical ducts 48 and 49 may be used for recirculating air, dampers 89 being provided to control the flow of air into these ducts. When the dampers are positioned so as to close the openings 90 (Fig. 19) the vitiated air in the car is discharged by static pressure in the car through exhaust grilles 91 located above the doorway 69.

What is claimed is:

1. In a ventilating system for railway cars, an overhead duct, a floor duct, a vertical duct in an end wall of the car joining the said ducts, means for moving air through the ducts, an air outlet associated with the overhead duct for exhausting air to the atmosphere, a fresh air inlet associated with the vertical duct for admitting fresh air therein, and valves for controlling the passage of air through said outlet and inlet.

2. In a ventilating system for railway cars, an overhead duct, a floor duct, a vertical duct in an end wall of the car joining the said ducts, a blower interposed in the air circuit between the overhead duct and the vertical duct, and means for exhausting air from the blower either to the vertical duct or to the outside atmosphere.

3. In a ventilating system for railway cars, an overhead duct, a floor duct, a vertical duct in an end wall of the car joining the said ducts, a blower interposed in the air circuit between the overhead duct and the vertical duct, and means for exhausting air from the blower either to the vertical duct or to the outside atmosphere, and a fresh air inlet for introducing fresh air into the vertical duct.

4. In a ventilating system for railway cars, an overhead duct, a floor duct, a vertical duct joining the said ducts, means for moving air through the ducts, and valve means interposed in the air circuit between the overhead duct and the vertical duct for selectively placing the overhead duct either in communication with the outside air or with the vertical duct.

5. In a ventilating system for railway cars, an overhead duct, a floor duct, a vertical duct joining the said ducts, means for moving air through the ducts, and valve means interposed in the air circuit between the overhead duct and the vertical duct for selectively placing the overhead duct either in communication with the outside air or with the vertical duct, said air moving means being located at substantially floor level.

6. In a ventilating system for railway cars, an overhead duct, a floor duct, a vertical duct in an end wall of the car joining the said ducts, a blower, and an air outlet associated with the overhead duct for exhausting vitiated air from the car, a blower associated with the floor duct for moving air through the vertical and floor ducts, an air inlet in the vertical duct, and means for controlling the size of the air outlet and inlet.

7. A ventilating system for railway cars comprising an overhead duct running longitudinally of the car, floor ducts on opposite sides of the car, a mixing chamber, a pair of vertical ducts at one end of the car both of which communicate with the mixing chamber through the floor ducts and one of which communicates with the overhead duct, an air outlet associated with the overhead duct, air inlets associated with the vertical ducts, valves for controlling said outlet and inlets, and means for moving air through said ducts.

8. In a ventilating system for railway cars, a closed air circuit including the car interior, an overhead duct, a vertical duct, and a floor duct, means for moving air through said ducts, means for exhausting air from the car including the overhead duct, and an air outlet at one end of the duct, and means for introducing fresh air into the car including the floor duct, the vertical duct and an air inlet in the vertical duct.

9. In a ventilating system for railway cars, a closed air circuit including the car interior, an overhead duct, a vertical duct, and a floor duct, means for moving air through said ducts, means for exhausting air from the car including the overhead duct, and an air outlet at one end of the duct, and means for introducing fresh air into the car including the floor duct, the vertical duct, an air inlet in the vertical duct, a heater associated with the floor duct, and a supplemental air circuit including a second vertical duct and a second horizontal floor duct, and an air inlet associated with said second vertical duct.

10. In a heating and ventilating system for railway cars, a heating chamber, a pair of floor ducts communicating with said chamber, vertical ducts at one end of the car communicating with the floor ducts, an overhead duct communicating with one of the vertical ducts and with the car interior, means for forcing air through said ducts, an air inlet in one of the vertical ducts, and means for placing the overhead duct in communication with the outside atmosphere.

11. In a ventilating system for cars, an upper and a lower conduit extending along the upper and lower portions of the car, a connecting conduit in communication with said upper and lower conduits, air moving means in said upper and lower conduits for circulating air through said car and conduits, and intake and discharge passages between said means for introducing fresh air into said system and for discharging foul air from said car.

12. In a railway car having a hollow door post, a ventilating system for said car comprising upper and lower conduits in communication with the interior of said post, a fan in said upper conduit for forcing air therethrough, and means for selectively directing all or a portion of said air into said hollow door post or through a port into the atmosphere exterior of the car.

MARTIN P. BLOMBERG.